(12) United States Patent
Ciotta

(10) Patent No.: US 6,856,804 B1
(45) Date of Patent: Feb. 15, 2005

(54) MOBILE STATION INTERNET MESSAGING

(75) Inventor: Bruce Ciotta, Bridgewater, NJ (US)

(73) Assignee: Verizon Wireless, Bedminster, NJ (US)

( * ) Notice: Subject to any disclaimer, the term of this patent is extended or adjusted under 35 U.S.C. 154(b) by 646 days.

(21) Appl. No.: 09/695,213

(22) Filed: Oct. 25, 2000

Related U.S. Application Data

(60) Provisional application No. 60/220,159, filed on Jul. 24, 2000.

(51) Int. Cl.$^7$ ................................................. H04Q 7/20
(52) U.S. Cl. ............................. 455/435.1; 455/432.1; 455/432.2; 455/433; 455/445; 455/426.1; 370/352; 370/353; 370/354; 370/355; 370/356; 370/357; 370/310; 370/328; 370/401; 345/853; 709/228; 709/229; 709/224
(58) Field of Search .......................... 455/435.1, 435.2, 455/435.3, 432.1, 432.2, 433, 445, 426.1, 332.3; 370/352–357, 310, 328, 401; 709/228, 229, 224; 345/853

(56) References Cited

U.S. PATENT DOCUMENTS

| | | | |
|---|---|---|---|
| 6,249,675 B1 | * | 6/2001 | Bruno et al. .............. 455/426.1 |
| 6,366,780 B1 | * | 4/2002 | Obhan |
| 6,636,502 B1 | * | 10/2003 | Lager et al. ................ 370/352 |
| 6,677,968 B1 | * | 1/2004 | Appelman .................. 345/853 |

OTHER PUBLICATIONS

"Short Messaging", TeleCommunication Systems, Inc., Jun. 21, 2000.

* cited by examiner

*Primary Examiner*—David Hudspeth
*Assistant Examiner*—David Nguyen
(74) *Attorney, Agent, or Firm*—McDermott Will & Emery LLP

(57) ABSTRACT

A wireless communications network provides the power status for mobile stations served by the wireless communications network to Internet service providers. Internet service providers make the power status for mobile stations available to Internet service provider subscribers. By knowing the power status of a particular mobile device, Internet service provider subscribers can send messages to the mobile device or may call the mobile device, knowing that it is activated and will receive the call.

7 Claims, 6 Drawing Sheets

$T_1$

| MIN | Power | Base Station₁ | ... | Base Stationₙ |
|---|---|---|---|---|
| 2025551212 | ON | XX14 | XY14 | |
| 7035551212 | OFF | | | |
| 3015551212 | OFF | XY14 | | |
| | | | | |
| | | | | |
| | | | | |
| | | | | |

Record₁ ... Recordₙ

| MIN | ISP | Power | Base Station₁ | ... | Base Stationₙ |
|---|---|---|---|---|---|
| 2025551212 | AOL™ | ON | XX14 | | XY14 |
| 7035551212 | EROLS™ | OFF | | | |
| 3015551212 | VERIZON™ | OFF | XY14 | | |
| 2025551212 | VERIZON™ | ON | XX14 | | XY14 |
| | | | | | |
| | | | | | |
| | | | | | |

Record₁ ... Recordₙ

Fig. 5

MOBILE STATION INTERNET MESSAGING

RELATED APPLICATIONS

This application claims the benefit of U.S. Provisional Patent Application Ser. No. 60/220,159 entitled MOBILE STATION INTERNET MESSAGING invented by Bruce Ciotta filed, Jul. 24, 2000, which is incorporated herein by reference.

FIELD OF THE INVENTION

The present invention relates to interaction between mobile communication systems and Internet provider systems, more particularly to transmissions of change of power status messages concerning mobile stations to an Internet service provider.

BACKGROUND

People are constantly improving the speed and reliability at which communications are carried out. As technology makes more and more information available, people have a need to disseminate information to one another quickly. People also want to know that the information is received shortly after it has been sent.

Attention recently has been directed to implementing communication services over the worldwide network now commonly known as the Internet. The Internet had its genesis in U.S. Government funded research (called ARPA) which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet, however, they have subsequently become widely used. TCP/IP is flexible and robust, in effect, TCP takes care of data integrity and IP moves the data.

The Internet basically comprises several large computer networks joined together over high-speed data links ranging from ISDN to T1, T3, FDDI, SONET, SMDS, OT1, etc., and provides two broad types of services: connectionless packet delivery service and reliable stream transport service. The most prominent of these national networks are MILNET (Military Network), NSFNET (National Science Foundation NETwork), and CREN (Corporation for Research and Educational Networking). An estimated 242 million people were connected to the Internet as of 1999 according to CommerceNet™ a Silicon Valley, California based organization composed of over 600 companies and organizations worldwide.

A simplified diagram of the Internet is depicted in FIG. 1. Generally speaking the Internet 50 consists of Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated in 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The information providers (IPs) are end systems that collect and market the information contained on the Internet through their own servers. Internet service providers (ISPs) are companies such as UUNET, PSI, MCI and SPRINT that transport the information, and market the usage of their networks. Hereinafter, ISP and Internet service provider will be used to refer to both ISPs and to IPs collectively, as both provide Internet access for subscribers.

Initially, ISPs merely provided access to the information available on the Internet to their subscribers. However, it was quickly recognized that messages could be sent between computers having access to the Internet. It was also recognized that a message could be stored on an intermediate computer for later delivery to a computer that was not connected to the Internet at the time the message was sent, but would later become connected to the Internet. Internet service providers began offering electronic mail (e-mail), enabling their subscribers to communicate by sending messages to one another as well as to other people with access to the Internet. Increasingly, people began using the Internet to communicate with one another, and began searching for faster modes of communication via the Internet.

The next advance in Internet communications related to popup message windows. By knowing that someone is connected to the Internet and the address of his or her computer, it is possible to open a window and send a copy of the window that opens on his or her screen. Typically, the original window and the copy are split into two parts, each part having its own functionality. One part of the original window allows the sender to type a message and transmit the message to a remote computer. Correspondingly, one part of the copy window allows the receiver to type a message and transmit the message to the same remote computer. The second part of each window is linked to the remote computer and receives all the typed messages and displays them on both the sender's screen and the receiver's screen so that both persons are able to read what the other has typed. An improvement of pop-up message windows is to provide voice grade transmissions from one computer to another via the Internet, much like a standard telephone call. Again, the sender of the voice call must know whether the intended recipient is connected to the Internet. As a result of these developments, many ISPs allow subscribers to specify addresses, i.e., an e-mail address, that a subscriber would like to be notified about when the address is actively connected to the Internet. In turn, when an ISP recognizes that a subscriber is connected to the Internet, the ISP looks at the various other Internet users specified by the subscriber and sends notification and a corresponding Internet protocol address if any of the other Internet users are actively connected to the Internet. If an actively connected Internet address that the subscriber has been notified about disconnects from the Internet, then the ISP removes notification from the subscriber's computer so that the subscriber knows that the particular Internet user using the Internet address is no longer available to receive communications via a pop-up message window or voice communications over the Internet.

Rapid advances have also been made concerning wireless communications, especially regarding the emergence of digital cellular telephones. Many new wireless communications devices and related services have emerged that allow people to communicate freely as they roam, without the need for a fixed network connection. In particular, modern digital public wireless telephone networks offer customers a wide range of communication services combined with a high degree of mobility. These services encompass sending and receive sophisticated voice, data and messaging services through a cellular or PCS network.

Wireless telephone communication systems supporting such services evolved from the Advanced Mobile Phone Service (AMPS) technology, introduced around 1983, to the more sophisticated digital-based air interface protocols. Digital access technologies include Time Division Multiple Access (TDMA) and Code Division Multiple Access (CDMA) schemes.

An exemplary digital cellular network 3 (depicted in FIG. 2) includes a number of mobile switching centers (MSCs) 11, only one of which appears in the drawing for simplicity of illustration. Each MSC 11 connects through trunk circuits to a number of base stations 13, which the MSC controls. Through the MSC 11 and the base stations 13, the network 3 provides voice-grade digital telephone services over the common air interface to and from the digital telephones 5. The network elements also provide data services over the logical communication channels, such as signaling channels used to keep track of digital telephones 5, and paging channels used to send data to and from digital telephones 5.

The digital telephones 5, the MSCs 11 and the base stations 13 implement one or more standard air-link interfaces. For example, the wireless telephone network 3 may support dual-mode services. Although not shown separately, such a dual-mode network includes wireless telephone components that output analog telephone signals for transmission according to an analog wireless protocol (e.g., AMPS) as well as digital wireless system components that operate in accord with a digital wireless protocol, for example the CDMA protocol IS-99. The base stations may provide both types of services. Alternatively, the network may comprise base stations that send and receive voice and signaling traffic according to the prescribed analog protocol as well as digital base stations that utilize the digital wireless protocol. Each dual-mode MSC typically includes a switching subsystem for analog telephone services, a switching subsystem for digital telephone services, and a control subsystem. Other MSCs may implement only one type of service.

The wireless network 3 includes a home location register (HLR) 15 that stores subscriber profiles for each of the wireless subscribers and their associated digital wireless telephones 5. The HLR 15 may reside in the home MSC 11 or in a centralized service control point that communicates with the MSC(s) 11 via an out-of-band signaling system such as an SS7 network. As recognized in the art, the HLR 15 stores for each mobile subscriber certain data such as the subscriber's mobile telephone number, the mobile identification number, the power status of her mobile telephone, information specifying what base stations 13 the subscriber is nearest, and the wireless services subscribed to by the mobile subscriber, such as numeric paging or text-based paging, data communication services, etc. The HLR 15 typically stores this information in tables contained within a database containing a record relating to each cellular telephone. Cellular telephone records are often updated, for example, when new services are subscribed to, when the subscriber powers on his or her digital telephone 5, or when the subscriber moves about causing his or her digital telephone 5 to de-register and register with various base stations 13. Additional information, for example power-off status, is also received and updated for digital telephones. The updated information in the HLR 15 informs the wireless network 3 of the current status of each digital wireless telephone 5, i.e., whether a particular digital telephone is powered on so that it may receive a call, what base station 13 to route the call to in order to reach the particular digital telephone 5, and what services are available during the call to or from the particular digital telephone 5.

Being readily available for contact has become increasingly important for a growing number of people who have a significant need to be reachable regardless of their location. Many such persons have a telephone for business, a telephone for home, a mobile cellular telephone in the car, a transportable telephone for personal carrying, as well as stations providing telephone service through computers. Business people and professionals at times have multiple offices and may additionally work at a home office. All of these telephones and computer stations generally have different telephone numbers and Internet addresses. This requires a caller to know or look up multiple numbers and addresses, and frequently to make multiple calls in order to reach a person, especially if the person's cellular telephone that is carried by that person is off.

A specific problem with current technology is that other than the ability to send a short e-mail message from an Internet user to a digital telephone, there is no communication link between Internet users and digital telephone users. Currently, people have no way of knowing whether the cellular telephone of someone they wish to contact is powered on or is off. It would be an asset to know the power status of an individual's cellular telephone so that someone could quickly determine whether that individual could be contacted via his or her cellular telephone.

SUMMARY OF THE INVENTION

The present invention fulfills a need for Internet service provider subscribers to know when specified mobile stations are in a power-on status. The present invention also fulfills a need to provide messaging capability for Internet service provider subscribers to send messages to identified mobile stations.

Embodiments of the present invention which provide power status messages from a wireless telecommunications network to an Internet service provider. The Internet service provider then makes the power-on or power-off status for identified mobile stations available to its subscribers. When an Internet service provider subscriber recognizes that one of the identified mobile stations is on, the subscriber can send a message via a short message server to the recognized mobile station.

One aspect of the present invention makes power-on and power-off signals from mobile stations transmitted via a wireless communications network available to an Internet service provider. A power-on or a power-off signal is transmitted from a mobile station, depending upon whether the mobile station has been powered on or shut down, to a wireless communications network via base stations. A mobile switching center sends the power-on or power-off signal to a home location register where the power status of the mobile station is updated. In response to updating the home location register, a change of mobile station power status message, correlated to the mobile station, is sent to an Internet service provider.

The power-on or power-off signal contains information that identifies the mobile station and indicates the mobile station's power status. An ISP, after receiving the change of mobile station power status message, correlates the mobile station identified in the message with one of its subscribers. The ISP also determines whether the correlated subscriber is connected to the Internet and notifies the subscriber, if the subscriber is connected to the Internet, by transmitting data for display, i.e., an icon if the mobile station has a power-on status, of the power status of the mobile station. If the mobile station is shut down while the subscriber is still connected to the Internet, then the ISP sends data to the subscriber's computer to remove the display indicating that the mobile station had a power-on status.

Upon recognizing that a mobile station has a power-on status, a subscriber can send a message to the mobile station if he or she chooses to do so. This may be accomplished, for example, by sending the message via the ISP to a short message server in the wireless communication system, and then forwarding the message to the mobile station via a mobile switching center.

The power-on or power-off signal originated by the mobile station is not limited to transmission to one ISP, but is transmitted to a plurality of ISPs.

Another aspect of the present invention also makes power-on and power-off signals from mobile stations transmitted via a wireless communications network available to an Internet service provider, but only for select mobile stations. A power-on or a power-off signal is transmitted from a mobile station, depending upon whether the mobile station has been powered on or shut down, to a wireless communications network via base stations. A mobile switching center sends the power-on or power-off signal to a home location register where the power status of the mobile station is updated. In response to updating the home location register, a determination is made whether the signal should be transmitted to an ISP, for example by verifying whether the mobile station is associated with one of the ISP's subscribers. If a determination is made, for example by checking a flag in the HLR that indicates that the mobile station is associated with one of the ISP's subscribers, that the signal should be sent; a change of mobile station power status message, correlated to the mobile station, is sent to the Internet service provider.

In one embodiment mobile stations transmit registration and de-registration signals as mobile stations register and de-register with base stations. The record in the HLR for each mobile station is updated each time a mobile station registers or de-registers with a base station. A change in registration message is formulated for transmission to a database, stored in a computer system remote from the HLR, that is related to at least one ISP. For each designated mobile station, the change in registration message is forwarded to an ISP, and the ISP delivers the change in registration information to a subscriber, who is connected to the Internet, and has specified the mobile station on the subscriber's list of mobile stations.

Yet another aspect of the present invention relates to a wireless, digital communication system. The wireless, digital communication system comprises a plurality of mobile stations and a plurality of base stations interfaced for wireless communication with the plurality of mobile stations. The base stations receive power status transmissions from the mobile stations. The wireless, digital communication system also comprises a mobile switching center connected to the base stations. The mobile switching center is linked to a home location register and transmits changes of power status for mobile stations to the home location register. The home location register stores service profiles for each mobile station, including the power status of the mobile station. The wireless, digital communication system also comprises a database, remote from the home location register. The remote database is associated with an Internet service provider and contains records correlating subscribers of the Internet service provider to particular mobile stations. The remote database is also connected through a data network to the home location register, and receives changes of the power status messages for each mobile station from the home location register.

Other advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing and in which like reference numerals refer to similar elements and in which:

FIG. 4 depicts an exemplary database arrangement for a HLR used with the embodiment of the present invention of FIG. 3.

FIG. 5 depicts an exemplary database arrangement for a remote collection device used with the embodiment of the present invention of FIG. 3.

DETAILED DESCRIPTION OF THE INVENTION

Figure 1:
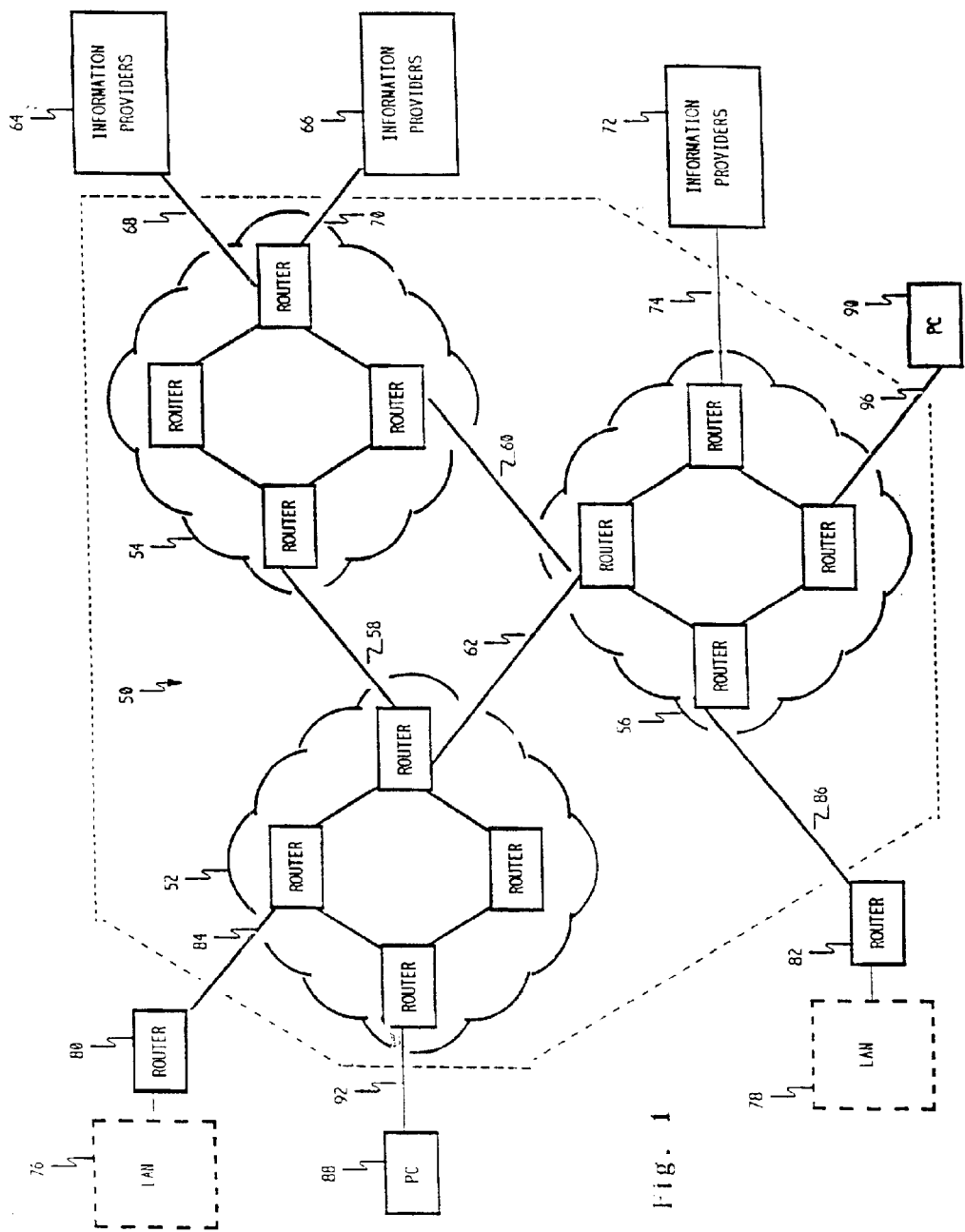
FIG. 1 is a schematic diagram of the Internet.
Figure 2:
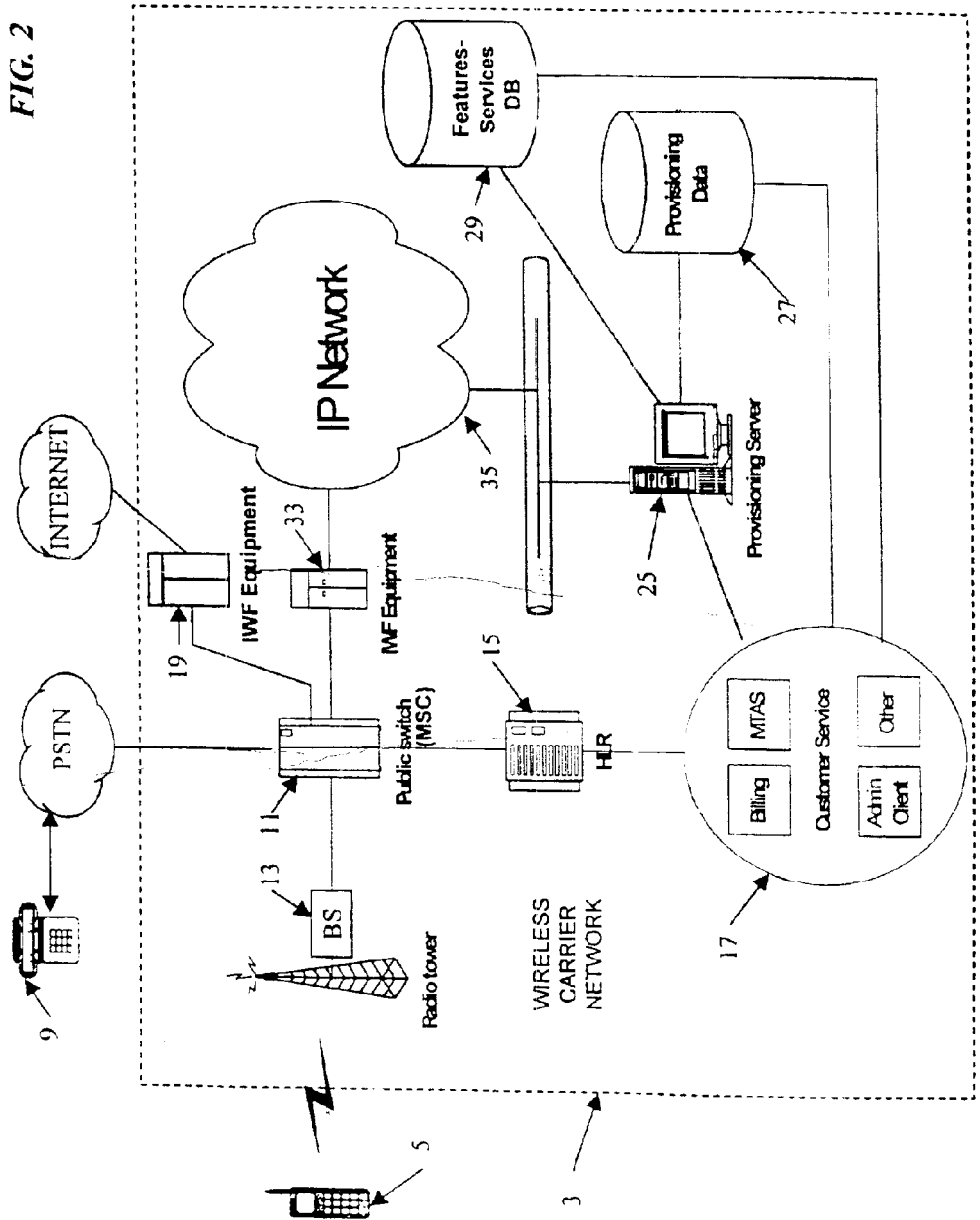
FIG. 2 is a schematic of an exemplary wireless communication system.

A methodology for transmitting power status messages related to mobile stations via a wireless network to an Internet service provider is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. When a machine is disconnected from the Internet, its unique number becomes available for another machine to use. When the machine is reconnected to the Internet, another unique number is assigned as that machine's address. In the address, the leftmost number is the highest number. By analogy this corresponds to the ZIP code in a mailing address. At times, the first two numbers constitute this highest portion of the address, and indicate a network or a locale. An indicated network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion.

Many ISPs and IPs provide a service that allows their subscribers to specify other Internet users that the subscribers are interested in knowing when the other Internet users are connected to the Internet. When an Internet user specified by a subscriber connects to the Internet, the ISP or IP sends notice to the subscriber indicating that the specified Internet user is connected to the Internet. Along with notification, the subscriber's computer is informed of the Internet protocol address used by a specified Internet user when the user connects to the Internet. By providing this service, ISPs and IPs allow their subscribers to recognize when specified other persons are connected to the Internet, and that communication, via a pop-up message window for example, could be established with a specified person who is on-line.

The present invention makes available the power status of specified mobile digital stations to an ISP subscriber. Power status information related to specified mobile digital stations allows ISP subscribers to recognize that a person they wish to contact is available for contact via his or her mobile digital station. Alternatively, the present invention allows a subscriber to send a message to the person's mobile digital station, and know that the message will be received by the station because it is on.

Information regarding the power status of a mobile digital station originates from the mobile digital station itself, and is transmitted over-the-air to a wireless communications network. As will be familiar to those of ordinary skill, an air-link interface for each cellular service in a geographic area includes paging channels and/or signaling channels, as well as actual communications channels for voice and/or data services. The channels may be separate frequency channels, or the channels may be logically separated, for example based on time division or code division. The paging and signaling channels are used for preliminary coded communications between a cellular telephone and a cell site that informs a wireless communications network of the power status and location of a cellular telephone. Preliminary coded communications are also used in setting up a telephone call or other session, after which a communication channel is assigned or set up for the telephone's use on that call. For example, when a cellular telephone is powered on it sends a signal that is received by the nearest base station indicating what particular cellular telephone originated the signal and that the cellular telephone is on. The base station transmits this information, along with and identifier that identifies the particular base station, to the cellular telephone's home network where the information is used to update a record in a HLR. At this point the wireless communications network uses the information, indicating the location of the mobile digital station and that the mobile digital station is on, contained in the HLR to send calls and messages to the mobile digital station. When powered off, mobile digital stations send a signal indicating that the particular mobile digital station is off. This information is used to update the record in the HLR related to the mobile digital station. At this point the wireless communications network uses the information, indicating that the mobile digital station is off, to recognize that a call or message cannot be placed or delivered, respectively, to the mobile digital station.

Figure 3:
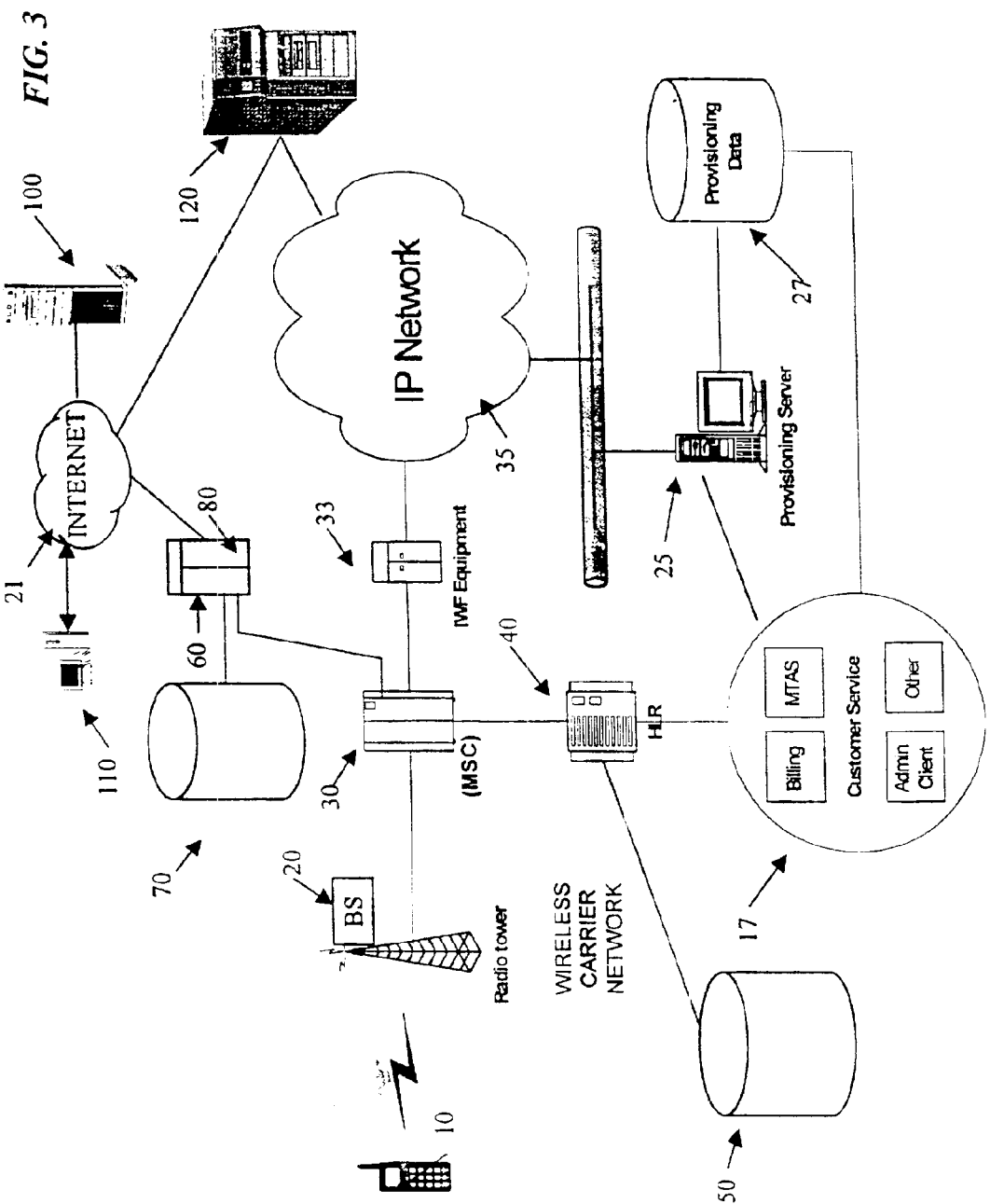
FIG. 3 is a schematic diagram illustrating transmission of power-on and power-off messages from a wireless, digital communications network to an Internet service provider and transmission of a message from an Internet service provider to a mobile station according to an embodiment of the present invention.

Referring to FIG. 3, an exemplary embodiment of the present invention relating to transmission of the power-on and power-off status of a mobile station via a wireless network to an Internet service provider is described.

When a mobile station 10 is turned on, a signal is sent from the mobile station 10 to a base station 20. Along with a flag indicating that the mobile station 10 is on, the signal contains at least a time stamp and an identifier of the mobile station 10, such as the mobile identification number (MIN), for example. The signal contains other data as well. The signal indicating the power-on status (power-on message) of the mobile station 10, is then transmitted from the base station 20 to a mobile switching center (MSC) 30. The power-on message for the mobile station 10 is forwarded from the mobile switching center 30 to a home location register (HLR) 40.

A database 50 residing within the HLR 40 contains records for all of the mobile stations that are served by the wireless network. When the power-on message from the mobile station 10 is received at the HLR 40, the mobile station identifier in the message, e.g., the MIN, is matched with a record in the database 50 containing the same identifier, i.e., a record that contains a matching MIN. The matching record in the database 50 is updated to reflect the time stamp and power-on status sent from the mobile station 10. The HLR 40 then forwards the power-on message that originated from the mobile station 10 to a remote computer system 60.

The remote computer system 60 communicates with a second database 70 that contains records correlating mobile stations with Internet service providers. Again, the mobile station identifier contained in the power-on message, e.g., the MIN, is matched with a record, but this time in the second database 70. The time stamp and power-on status are updated in the record in the second database 70 to reflect the power-on status of the mobile station 10.

A program 80 runs on computer system 60 to remove wireless communication network specific data from the updated record before the updated record is sent to Internet service provider 100. For example, the program 80 recognizes that Internet service provider 100 requires only information regarding the identifier, i.e., MIN, for mobile station 10, the time stamp, and the power-on flag, so all other information is removed from the updated record before it is sent from the second database 70 to the Internet service provider 100. The program 80 is not limited to running on computer system 60, for example, the program 80 could run at the home location register 40, or other location.

When an Internet service provider subscriber, who has identified the mobile station 10 as a mobile station that they would like to know the power status for, registers on-line, the Internet service provider 100 forwards notification to the subscriber's computer 110 that mobile station 10 is in a power-on status. Upon recognizing that the mobile station 10 is on, the subscriber uses his or her computer 110 to send a message, via his or her Internet service provider, to a short message server 120. The short message server 120, which is a part of the wireless communications network that provides services for the digital mobile station 10, forwards the subscriber's message to a wireless communications network, for example via the MSC 30. The wireless communications network then forwards the subscriber's message to the mobile station 10.

By providing information concerning the power-on status of mobile stations that an Internet service provider subscriber has identified as having an interest in knowing the power status for, the present invention allows subscribers to know that a person is available for communication via a mobile station 10. The present invention also allows the subscriber to take advantage of Internet communications to contact a mobile station, thereby avoiding the costs associated with originating and receiving wireless telephone calls.

The mobile station 10 also transmits a signal to a base station 20 when it is turned off. Along with a flag indicating that the mobile station 10 is off, the signal contains at least a time stamp and an identifier of the mobile station 10, such as the mobile identification number (MIN), for example. The signal indicating the power-off status (power-off message) for the mobile station 10, is then transmitted from the base station 20 to the MSC 30. The power-off message originating from the mobile station 10 is forwarded from the MSC 30 to the HLR 40.

When the power-off message from the mobile station 10 is received at the HLR 40, the mobile station identifier in the message, e.g., the MIN, is matched with the record in the database 50 containing the same identifier, i.e., the record that contains the matching MIN. This is the same record that was matched when the HLR 40 received the power-on message. The matching record in the database 50 is updated to reflect the time stamp and power-off status sent from the mobile station 10. The HLR 40 then forwards the power-off message related to the mobile station 10 to the remote computer system 60.

The remote computer system 60 communicates with a second database 70 that also contains records relating to mobile stations. Again, the mobile station identifier in the message, e.g., the MIN, is matched with a record, but this time in the second database 70. This is the same record that was matched when the computer system 60 received the power-on message. The time stamp and power-off status are updated in the record in the second database 70 to reflect the power-off status of the mobile station 10.

A program 80 runs on computer system 60 to remove wireless communication network specific data from the updated record before the updated record is sent to Internet service provider 100. For example, the program 80 recognizes that Internet service provider 100 requires only information regarding the identifier, i.e., MIN, for mobile station 10, the time stamp, and the flag indicating power status. Other information is removed from the updated record by program 80 before the updated record is sent from the second database 70 to the Internet service provider 100. The program 80 is not limited to running on computer system 60, for example, the program 80 could run at the home location register 40, or other location. The program 80 serves other functions. For example, instead of sending all updated records to Internet service provider 100, program 80 could select certain updated records to send to Internet service provider 100. This might be performed, for example, if ISP subscriber notification is not an available feature for every mobile station served by a wireless communications network.

When an Internet service provider subscriber, who has identified the mobile station 10 as a mobile station that they would like to know the power status for, registers on-line, the Internet service provider 100 simply sends no information to the subscriber's computer 110 relating to mobile station 10. However, if the subscriber was already on-line while mobile station 10 was in a power-on status, the subscriber would have received notification that mobile station 10 is in a power-on status as described above. If mobile station 10 is turned off while the subscriber is still on-line, the Internet service provider 100 removes notification of mobile station 10's power-on status from the subscriber's computer 10. When a subscriber sees that the power-on notification related to mobile station 10 has been removed, the subscriber recognizes that mobile station 10 is no longer available for direct communication or for receiving messages as described above.

It is easily recognized that a plurality of mobile stations transmit power-on and power-off signals via the wireless communications network to the home location register 40, and that the power status for each mobile station is maintained in a separate record in the database 50 that communicates with the HLR 40. Likewise, the computer system 60 and second database 70 contain records that are updated with changes in power status for each of the plurality of mobile stations.

It is also easily recognized that a plurality of Internet service providers can be served by the computer system 60. For example, the second database 70 could contain a table associated with each Internet service provider. When a power-on message or a power-off message is received at computer system 60, all records related to the mobile station identified in the power-on message or power-off message, and residing on the various tables, are updated with the new time stamp and power status. Updated records are then sent, as described above, from each table in the second database 70 to the associated ISP for each table.

Another embodiment of the present invention comprises updating the second database 70 each time the HLR 40 receives a message from a mobile station 10 indicating that the mobile station is communicating with a new base station 20. Information relating to the base station 20 with which a mobile station 10 is communicating is forwarded to an ISP 100 and to the ISP subscribers who have identified mobile station 10 to the ISP. Such information could be used if an ISP subscriber wanted to approximately locate where the identified mobile station 10 is located.

The home location register is a database that identifies wireless customers and contains data related to features and services that customers have on their mobile digital stations. The HLR database also is used to keep track of where customers are located and the power status of mobile digital stations so that the wireless communications network knows where to route a call in order for a call to reach a particular mobile digital station. It is recognized that many tables reside on the HLR database in order to store all the information in an organized and retrievable manner. FIG. 4 depicts some exemplary tables T1, T2, and T3 in a HLR database for use with the embodiment of the present invention depicted in FIG. 3. Other tables exist in the HLR database, but are not shown.

The table T1 contains a column for identifiers for each digital mobile station, such as the MIN for example, a column that contains a flag that indicates the power status for each digital mobile station, and a column that contains an identifier for each base station that the digital mobile station is communicating with. Although only one base station column is shown, if a digital mobile station is communicating with more than one base station, there will be a column for each base station. Table T1 provides information that relates each digital mobile station to a power status, i.e., on or off, and to at least a base station, By identifying a base station, a specific wireless communications network that the base station is a part of is identified, and calls and messages are routed to the digital mobile station. In the event that the digital mobile station is not available to receive a call, i.e., is off or is not communicating with any base stations, calls and messages are routed elsewhere, for example, to voice mail. When a signal containing power status information or registration/de-registration information is received by the HLR, table T1 is updated with the new information. If decisions whether to transmit power status and/or registration/de-registration information to an ISP are made at the HLR, then table T1 includes a column (not shown) containing information that indicates whether the information should be transmitted to a collection device for each digital mobile station.

The collection device communicates with a database containing relationships between digital mobile stations and ISPs, and receives power status and/or registration and de-registration information concerning digital mobile stations from a home location register. An exemplary table T2 contained within the collection device database is depicted in FIG. 5. There are other manners for arranging the data contained within the collection device database, for example the ISP identification column could be removed and instead a table could be created for each ISP. A signal received at the collection device contains an identifier for a digital mobile station, such as a MIN, that is matched with an identifier, i.e., a MIN contained in a column (record) in the collection device database. After a match is made, the record for the corresponding MIN is updated with the power status and/or the registration/de-registration information transmitted by the signal. The updated power status and/or registration/de-registration information is then transmitted to any ISPs in the ISP identifier column of records containing the matching MIN. Because several ISPs may be interested in information relating to a particular digital mobile station, table T2 will likely contain multiple records that have the same MIN, but will have a different ISP identifier in the ISP identifier column. If decisions whether to transmit power status and/or registration/de-registration information to an ISP are made at the collection device, then table T2 includes a column (not shown) containing information that indicates whether the information should be transmitted to an ISP correlated to each MIN.

Figure 6A:
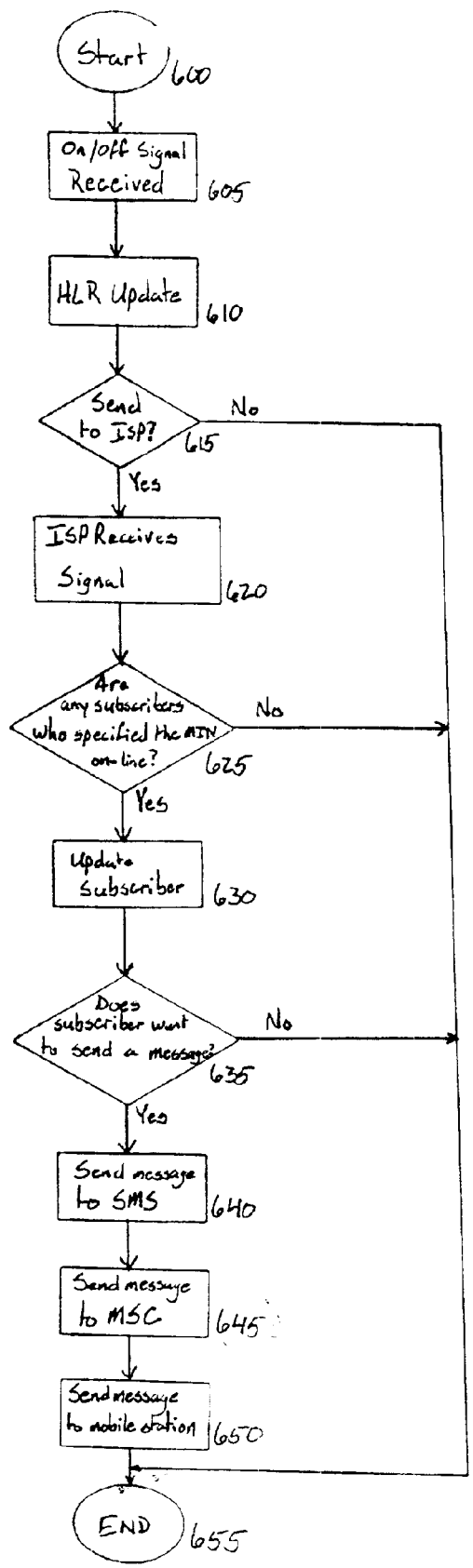
FIGS. 6a and 6b are flow charts of processing signals from mobile stations according to the embodiment of the present invention of FIG. 3.
Figure 6B:
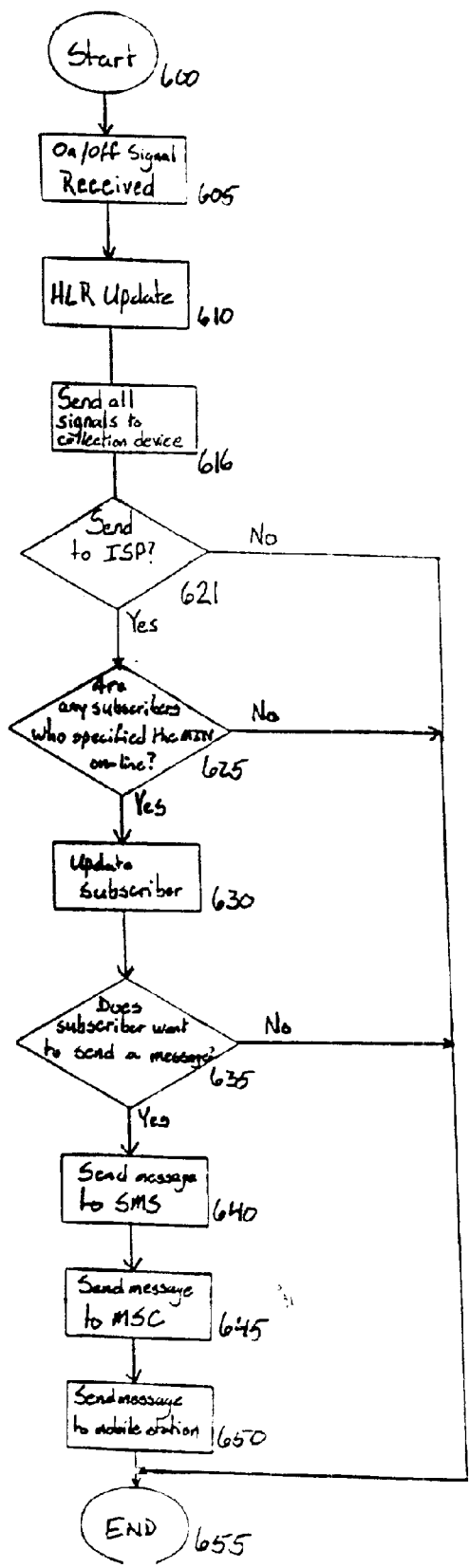

FIG. 6 depicts a flow chart that diagrams the flow of a signal from a digital mobile station to an ISP subscribers computer, and the flow that a message from the subscriber takes to reach the digital mobile station. A signal, containing information regarding the MIN, and/or power status, and/or registration/de-registration information, originates from a digital mobile station at step 600, and is received by a wireless communications network via a base station at step 605. The signal is transmitted within the wireless communications network to the HLR. The HLR receives the signal at step 610, and matches the MIN contained in the signal to a MIN in a record in the HLR database. After a matching record has been identified, the record is updated with the information contained in the signal. This means that the power status of the digital mobile station is updated, if power status information was included in the signal, and what base station the digital mobile station is registered with is updated, if the digital mobile station has moved and is communicating with a new base station. In FIG. 6, the HLR determines whether the signal from the digital mobile station should be forwarded to an ISP in step 615. If the signal should be forwarded, the signal is sent to a collection device, and records with matching MINs in the database communicating with the collection device are updated with the information contained in the signal. Alternatively, the HLR does not determine whether to forward the signal, but simply forwards all signals to the collection device where records with matching MINs in the database communicating with the collection device are updated with the information contained in each signal. In this instance, the collection device determines whether a particular signal should be forwarded to an ISP at step 615. If the signal should not be forwarded to an ISP then processing for that signal ends at step 655. However, if the signal should be forwarded to an ISP then the updated information from the signal is sent to all ISPs correlated with the MIN.

An ISP receives the updated power status and/or registration/de-registration information relating to a MIN in step 620. After the ISP receives the updated information and the related MIN, a check is performed in step 625 to verify whether any subscribers who have specified the MIN as one they are interested in knowing the power status of and/or the registration/de-registration location are connected to the Internet. If such a subscriber is on-line, the ISP sends the updated information to the subscriber's computer in step 630. However, if no subscribers who have specified the MIN as one they are interested in knowing the power status of and/or the registration/de-registration location are connected to the Internet then processing for that signal ends at step 655. An ISP can restart processing for a signal that indicates a power-on status at step 625 by periodically verifying whether any subscribers who have specified the MIN as one they are interested in knowing the power status of and/or the registration/de-registration location are connected to the Internet.

When an on-line subscriber's computer receives the updated information related to the MIN in step 630 one of several actions occurs. If the digital mobile device was just powered on, then the subscriber's computer displays information disclosing the fact that the particular digital mobile station has a power-on status, and the location of the base station with which the digital mobile station is communicating. For example, this might be performed by placing an icon on the subscriber's screen, or by updating a list that the subscriber views. If the digital mobile station was just powered down, and the subscriber already has information disclosing the power-on status and location of the digital mobile station, then the information is removed from the subscriber's computer screen. If the signal contains only updated location information related to the registration/de-registration status of the digital mobile station, and the subscriber already has information disclosing the power-on status and location of the digital mobile station, then only the location information displayed on the subscriber's computer screen is modified.

The final processing step for a signal, which originated from a digital mobile station, is step 630. However, the present invention encompasses responding by sending a message to the digital mobile station. If a subscriber does not desire to send a message (step 635) to a digital mobile station, then processing ends at step 655.

However, a subscriber may choose to send a message at step 635. The subscriber types a short message and sends the message, for example via e-mail, to a short message server in step 640. The short message server is connected to the wireless communications network that provides wireless communications services for the digital mobile device to which the subscriber wishes to send a message. In step 645, the short message server sends the subscriber's message to a MSC. The MSC then forwards the subscriber's message to the digital mobile station via the wireless communications network in step 650. Once the digital mobile station has received the subscriber's message the process flow ends at step 655.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. A method comprising the steps of:

maintaining power-on and power-off status for each of a plurality of mobile telephone stations in a first database, wherein the first database comprises a mobile switching system home location register (HLR) that contains subscriber listings for the plurality of mobile stations and the step of maintaining comprises:

receiving at a mobile switching center (MSC) power-on and power-off signals that are indicative of changes in a power status for each of the plurality of mobile stations, and updating the HLR in response to the received power-on and power-off signals; and formulating a change of status message for transmission to a second database related to at least one Internet Service Provider (ISP) in response to a change in the status for at least one of the plurality of mobile stations, wherein the second database contains a table associated with the ISP, the table contains records of respective mobile identification numbers (MIN's) of mobile stations that are provisioned for power-on and power-off status transmissions to the ISP, and further comprising the steps of:

transmitting a change of status message to the second database;

comparing the MIN contained in the change of status message with the table associated with the ISP;

in response to a match of the MIN in the comparing step, updating the record containing the MIN to reflect the status contained in the change of status message; and providing to the ISP subscriber data indicating the status of the mobile station if the ISP subscriber is on line.

2. A method as recited in claim 1, wherein the data provided in the providing step contains information, for displaying at a monitor screen of the ISP subscriber, an indication that the mobile station is in an active power state if the message contains active status data for the mobile station.

3. A method as recited in claim 2, wherein the data provided in the providing step contains information, for deletion of the active indication display at the monitor screen of the ISP subscriber, if the message contains inactive status data for the mobile station.

4. A method comprising the steps of:

maintaining power-on and power-off status for each of a plurality of mobile telephone stations in a first database, wherein the first database comprises a mobile switching system home location register (HLR) that contains subscriber listings for the plurality of mobile stations and the step of maintaining comprises:

receiving at a mobile switching center (MSC) power-on and power-off signals that are indicative of changes in a power status for each of the plurality of mobile stations, and updating the HLR in response to the received power-on and power-off signals; and formulating a change of status message for transmission to a second database related to at least one Internet Service Provider (ISP) in response to a change in the status for at least one of the plurality of mobile stations, wherein:

the second database is stored in a processor remote from the location of the HLR and contains a plurality of tables associated with respective ISP's, each of the tables relating subscribers of its respective ISP with mobile identification numbers (MIN's) of mobile stations;

the step of maintaining further comprises setting a flag in the HLR database for each MIN that is listed in the second database;

the step of formulating comprises identifying a flag in the HLR for the mobile station that has changed status; and the method further comprises the step of transmitting the change of status message to the second database.

5. A method as recited in claim 4, wherein:

the change of status message contains the changed power status and MIN of the mobile station in response to which the change of status message has been formulated, and further comprising the steps of:

comparing the MIN contained in the change of status message with the table;

in response to a match of the MIN in the comparing step, determining whether the ISP subscriber related to said MIN in the table is on line with the Internet; and providing to the ISP subscriber data relating the status of said mobile station if the ISP subscriber is on line.

6. A method comprising the steps of:

maintaining power-on and power-off status for each of a plurality of mobile telephone stations in a first database, wherein the first database comprises a mobile switching system home location register (HLR) that contains subscriber listings for the plurality of mobile stations and the step of maintaining comprises:

receiving at a mobile switching center (MSC) power-on and power-off signals that are indicative of changes in a power status for each of the plurality of mobile stations, and updating the HLR in response to the received power-on and power-off signals;

formulating a change of status message for transmission to a second database related to at least one Internet Service Provider (ISP) in response to a change in the status for at least one of the plurality of mobile stations;

receiving at the MSC registration and de-registration signals, indicative of establishing communication and loss of communication, respectively, with mobile communications network base stations for each of the plurality of mobile stations;

wherein the HLR is updated further in response to receipt of the registration and de-registration signals; and formulating a change of registration message for transmission to a second database related to at least one Internet Service Provider (ISP) in response to a change in the registration for at least one of the plurality of mobile stations, wherein:

the second database is stored in a processor remote from the location of the HLR and contains a plurality of tables associated with respective ISP's, each of the tables relating subscribers of its respective ISP with mobile identification numbers (MIN's) of mobile stations;

the step of maintaining further comprises setting a flag in the HLR database for each MIN that is listed in the second database;

the step of formulating comprises identifying a flag in the HLR for the mobile station that has changed registration; and the method further comprises the step of transmitting the change of registration message to the second database.

7. A method as recited in claim 6, wherein:

the change of registration message contains the changed base station registration status and MIN of the mobile station in response to which the change of registration message has been formulated, and further comprising the steps of:

comparing the MIN contained in the change of registration message with the table;

in response to a match of the MIN in the comparing step, determining whether the ISP subscriber related to said MIN in the table is on line with the Internet; and providing to the ISP subscriber data relating the base station registration of said mobile station if the ISP subscriber is on line.

* * * * *